United States Patent
Lo

(10) Patent No.: US 10,735,350 B1
(45) Date of Patent: *Aug. 4, 2020

(54) SYSTEMS AND METHODS FOR PROVIDING A COMPATIBLE BACKPLANE OPERATION MECHANISM FOR 2.5-GIGABIT HIGH-SPEED ETHERNET

(71) Applicant: Marvell Asia Pte, Ltd., Singapore (SG)

(72) Inventor: William Lo, Cupertino, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 6 days.

This patent is subject to a terminal disclaimer.

(21) Appl. No.: 16/208,092

(22) Filed: Dec. 3, 2018

Related U.S. Application Data

(63) Continuation of application No. 15/400,435, filed on Jan. 6, 2017, now Pat. No. 10,148,597.

(60) Provisional application No. 62/278,674, filed on Jan. 14, 2016, provisional application No. 62/275,533, filed on Jan. 6, 2016.

(51) Int. Cl.
  *H04L 12/931* (2013.01)
  *H04L 29/08* (2006.01)
  *H04L 29/06* (2006.01)
  *H04L 12/46* (2006.01)

(52) U.S. Cl.
  CPC .......... *H04L 49/352* (2013.01); *H04L 12/462* (2013.01); *H04L 69/18* (2013.01); *H04L 69/323* (2013.01)

(58) Field of Classification Search
  CPC ..... H04L 49/352; H04L 12/462; H04L 69/18; H04L 69/323
  See application file for complete search history.

(56) References Cited

U.S. PATENT DOCUMENTS

| | | | |
|---|---|---|---|
| 6,618,395 B1 * | 9/2003 | Kimmitt | H04L 1/004 370/473 |
| 6,738,935 B1 * | 5/2004 | Kimmitt | H04L 1/0045 370/464 |
| 2015/0171892 A1 * | 6/2015 | Yu | H03M 9/00 370/254 |

* cited by examiner

*Primary Examiner* — Thai Nguyen

(57) ABSTRACT

Embodiments described herein provide a method for providing a compatible backplane operation mechanism for 2.5-gigabit Ethernet. A first input of data including a first sequence-ordered set in compliance with a first interface protocol is received from a medium access control (MAC) layer. The first input of data is encoded into four outputs of encoded data including a second sequence-ordered set in compliance with a second interface protocol. The first sequence-ordered set in a first form of a sequence code followed by three bytes of data is mapped to the second sequence-ordered set in a second form of consecutive units of the sequence code followed by an encoded data byte. The four parallel outputs of encoded data are serialized into a serial output. The serial output to a linking partner is transmitted on a physical layer of an Ethernet link at a speed specified in the second interface protocol.

20 Claims, 11 Drawing Sheets

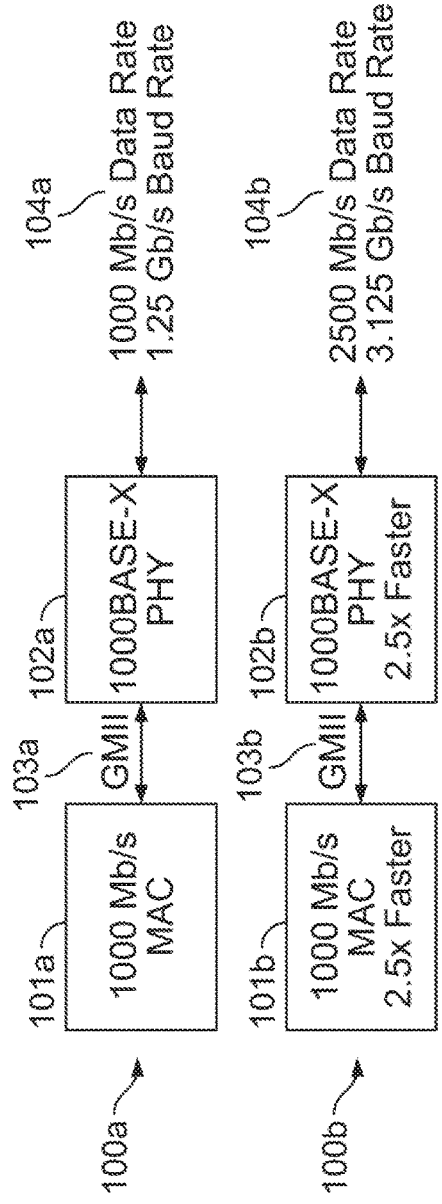
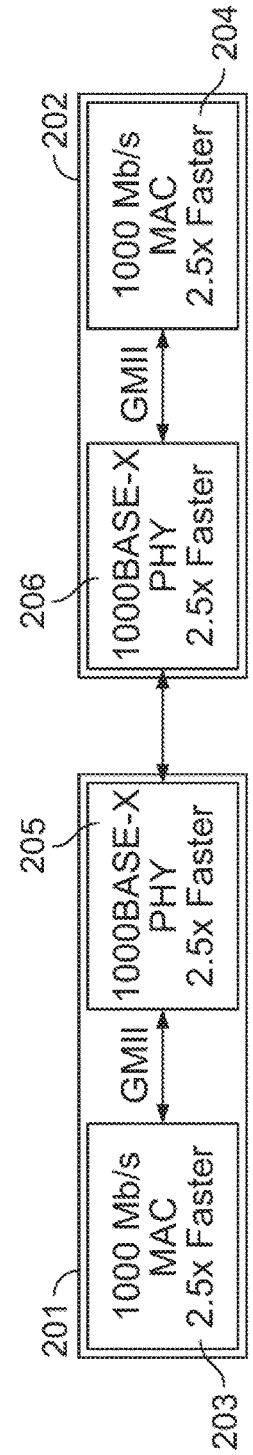
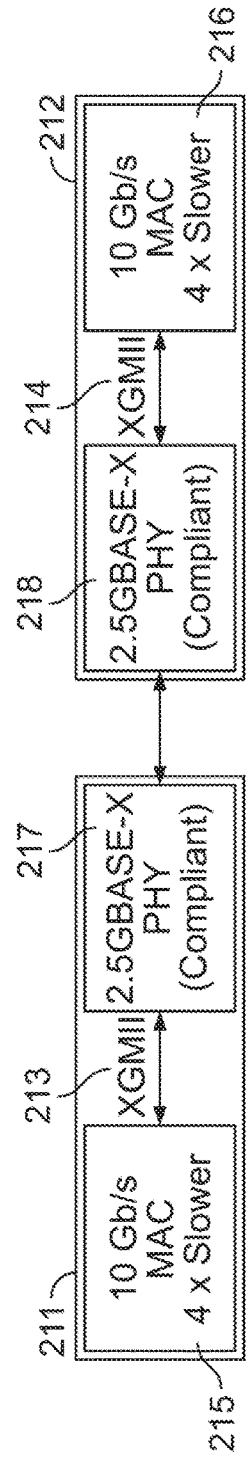
FIG. 1
FIG. 2
FIG. 3

| Four 2.5GPII | | | | | | XGMII | | | | |
|---|---|---|---|---|---|---|---|---|---|---|
| GPII 0 | GPII 1 | GPII 2 | GPII 3 | Prev Word | Next Word | Byte 0 | Byte 1 | Byte 2 | Byte 3 | Prev Word |
| Data A/Err | Data B/Err | Data C/Err | Data D/Err | Not Idle | X | Data A/Err | Data B/Err | Data C/Err | Data D/Err | Data |
| Data * | Data A/Err | Data B/Err | Data C/Err | Idle | X | SOP | Data A/Err | Data B/Err | Data C/Err | Data |
| Idle | Idle | Idle | Idle | Not Data | X | Idle | Idle | Idle | Idle | Idle |
| Idle | Idle | Idle | Idle or Carrier Extend | Data | X | Terminate | Idle | Idle | Idle | Idle |
| Data A/Err | Data B/Err | Idle | Idle | Data | X | Data A/Err | Terminate | Idle | Idle | Idle |
| Data A/Err | Data B/Err | Data C/Err | Idle or Carrier Extend | Data | X | Data A/Err | Data B/Err | Terminate | Idle | Idle |
| Data A/Err | Data B/Err | Data C/Err | Carrier Extend | Data | X | Data A/Err | Data B/Err | Data C/Err | Sequence | Idle |
| LPI | LPI | LPI | LPI | X | X | LPI | LPI | LPI | LPI | Idle |
| Idle | Idle | LPI | LPI | X | X | LPI | LPI | LPI | LPI | Idle |
| LPI | Idle | Idle | Idle | X | X | Idle | Idle | Idle | Idle | Idle |
| Sequence | Data S0 | Sequence | Data S1 | X | Sequence S2, S3 | Sequence | Data X | Data Y | Data Z | Sequence |
| Sequence | Data S0 | Sequence | Data S1 | X | Not Sequence S2,S3 | Idle | Idle | Idle | Idle | Idle |
| Sequence | Data S2 | Sequence | Data S3 | Sequence | X | Sequence | Data X | Data Y | Data Z | Idle |
| Else | | | | | | Error | Error | Error | Error | Error |

FIG. 7

SYSTEMS AND METHODS FOR PROVIDING A COMPATIBLE BACKPLANE OPERATION MECHANISM FOR 2.5-GIGABIT HIGH-SPEED ETHERNET

CROSS-REFERENCE TO RELATED APPLICATIONS

This application is a continuation of U.S. patent application Ser. No. 15/400,435, filed Jan. 6, 2017 (now allowed), which claims the benefit under 35 U.S.C. § 119(e) of U.S. Provisional Patent Applications Nos. 62/275,533, filed on Jan. 6, 2016 and 62/278,674, filed on Jan. 14, 2016, each of which is hereby incorporated by reference herein in its respective entirety.

FIELD OF USE

This disclosure relates to physical layer (PHY) and medium access control (MAC) layer control in Gigabit Ethernet; for example, to transmit data via Ethernet at a data rate 2.5 times faster than the speed specified in the Institute of Electrical and Electronics Engineers (IEEE) 802.3z standard (1000BASE-X). Such Ethernet transmission is suitably used to provide transfer of data in local area networks (LAN), wide area networks (WAN), and device-to-device (P2P) networks.

BACKGROUND OF THE DISCLOSURE

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the present disclosure.

Gigabit Ethernet allows transmission of Ethernet frames at a rate of a gigabit per second (1000 Mb/s). The initial standard for Gigabit Ethernet was introduced by the IEEE as IEEE 802.3Z, which is commonly referred to as 1000BASE-X. 1000BASE-X Ethernet typically is built using an optical fiber infrastructure, or has been used over copper backplanes (i.e. 1000BASE-KX). Advancements in PHY transmission technologies facilitate Ethernet over twisted pair copper wire at a speed of 2.5 Gigabits per second (Gb/s) or 5 Gb/s. The resulting standard for 2.5 Gb/s Ethernet is named 2.5GBASE-X. However, no existing IEEE standard regulating 2.5-Gigabit Ethernet over optical fiber has been published. As a result, 2.5-Gigabit Ethernet over optical fiber is sometimes achieved by speeding up 1000BASE-X Ethernet 2.5 times faster. 2.5GBASE-X Ethernet and 1000BASE-X Ethernet running 2.5 times faster are not necessarily interoperable, as 2.5GBASE-X Ethernet does not necessarily fit an accepted framework that regulates high-speed Ethernet.

SUMMARY

Embodiments described herein provide a method for providing a compatible backplane operation mechanism for 2.5-gigabit high-speed Ethernet. A first input of data including a first sequence-ordered set in compliance with a first interface protocol is received from a medium access control (MAC) layer of an Ethernet link. The first input of data is encoded into four outputs of encoded data including a second sequence-ordered set in compliance with a second interface protocol. The first sequence-ordered set in a first form of a sequence code followed by three bytes of data is mapped to the second sequence-ordered set in a second form of consecutive units of the sequence code followed by an encoded data byte. The four parallel outputs of encoded data are serialized into a serial output. The serial output to a linking partner is transmitted on a physical layer of an Ethernet link at a speed specified in the second interface protocol.

In one implementation, the first input of data is encoded at a reconciliation layer between the physical layer and the MAC layer of the Ethernet link.

In one implementation, the first input of data in compliance with 10-gigabit media-independent interface (XGMII) is encoded into four outputs of encoded data in compliance with 2.5-Gigabit physical coding sublayer intermediate interface (2.5GPII).

In one implementation, the first sequence-ordered set is configured to include a one-byte sequence code followed by a first data byte, a second data byte and a third data byte. The second sequence-ordered set is configured to include the one-byte of sequence code, a first encoded data byte, the one-byte of sequence code, a second encoded data byte, the one-byte of sequence code, a third encoded data byte, the one-byte of sequence code, and a fourth encoded data byte.

In one implementation, when the second ordered set is a /Q/ ordered set defined by IEEE 802.3z standard, the eighth bit of the first encoded data byte, the eighth bit of the fourth encoded data byte are configured as zero, and the eighth bit of the second encoded data byte and the eighth bit of the third encoded data byte are configured as one.

In one implementation, when the second ordered set is a /Fsig/ ordered set defined by IEEE 802.3z standard, the eighth bit of the second encoded data byte is configured as one, and the eighth bit of the first encoded data byte, the eighth bit of the third encoded data byte, and the eighth bit of the fourth encoded data byte are configured as zero.

In one implementation, the first six bits of the first encoded data byte are configured as equal to first six bits of the first data byte. The first six bits of the second encoded data byte are configured as equal to first four bits of the second data byte followed by last two bits of the first data byte. The first six bits of the third encoded data byte are configured as equal to first two bits of the third data byte followed by last four bits of the fourth data byte. The first six bits of the fourth encoded data byte are configured as equal to last six bits of the fourth data byte. The seventh bit of each encoded data byte is configured as equal to the eighth bit of each respective encoded data byte when the third bit of the respective encoded data byte is zero. The seventh bit of each encoded data byte is configured as equal to the fifth bit of each respective encoded data byte when the third bit of the respective encoded data byte is one.

In one implementation, a second input of data in compliance with the second interface protocol is obtained from the physical layer of the Ethernet link. The second input of data is aligned into four parallel streams of data. The four parallel streams of data are mapped into one data stream of data in compliance with the first interface protocol. The one data stream of data is transmitted to the MAC layer of the Ethernet link. The aligning includes using deficit idle counting (DIC) to enforce a start of packet of each of the four parallel outputs of data on byte 0.

In one implementation, every other first sequence ordered set in the input of data is abandoned, and the input of data includes a variable to track whether to abandon a next sequence ordered set in the input of data.

In one implementation, the second sequence-ordered set is passed based at least in part on a transmission state diagram specified in IEEE 802.3z standard with added sequence-ordered set configuration operations.

Embodiments described herein further provide a communication interface for providing a compatible backplane operation mechanism for 2.5-Gigabit high-speed Ethernet. The communication interface comprises word-encoding circuitry, word-serializing circuitry, and a physical layer interface. The word-encoding circuitry is configured to receive, from a medium access control (MAC) layer of an Ethernet link, a first input of data including a first sequence-ordered set in compliance with a first interface protocol, encode the first input of data into four parallel outputs of encoded data including a second sequence-ordered set in compliance with a second interface protocol. The word-encoding circuitry is further configured to map the first sequence-ordered set in a first form of a sequence code followed by three bytes of data to the second sequence-ordered set in a second form of consecutive units of the sequence code followed by an encoded data byte. The word-serializing circuitry is communicatively coupled to the word encoding circuitry, and the word serializing circuitry is configured to generate a serial output by serializing the four parallel outputs of encoded data. The physical layer interface is configured to transmit the serial output to an Ethernet link at a speed specified in the second interface protocol.

In one implementation, the word-encoding circuitry is placed at a reconciliation layer disposed between the physical layer and the MAC layer of the Ethernet link.

In one implementation, the word-encoding circuitry is further configured to encode the first input of data in compliance with XGMII into four outputs of encoded data in compliance with 2.5GPII.

In one implementation, the word-encoding circuitry is further configured to: configure the first sequence-ordered set as a one-byte sequence code followed by a first data byte, a second data byte and a third data byte; and configure the second sequence-ordered set as the one-byte of sequence code, a first encoded data byte, the one-byte of sequence code, a second encoded data byte, the one-byte of sequence code, a third encoded data byte, the one-byte of sequence code, and the fourth encoded data byte.

In one implementation, the word-encoding circuitry is further configured to: when the second ordered set is a /Q/ ordered set, configure the eighth bit of the first encoded data byte, the eighth bit of the fourth encoded data byte zero, and the eighth bit of the second encoded data byte and the eighth bit of the third encoded data byte as one.

In one implementation, the word-encoding circuitry is further configured to: when the second ordered set is a /Fsig/ ordered set, configure the eighth bit of the second encoded data byte as one, and configure the eighth bit of the first encoded data byte, the eighth bit of the third encoded data byte, and the eighth bit of the fourth encoded data byte as zero.

In one implementation, the word-encoding circuitry is further configured to: configure first six bits of the first encoded data byte as equal to first six bits of the first data byte; configure first six bits of the second encoded data byte as equal to first four bits of the second data byte followed by last two bits of the first data byte; configure first six bits of the third encoded data byte as equal to first two bits of the third data byte followed by last four bits of the fourth data byte; configure first six bits of the fourth encoded data byte as equal to last six bits of the fourth data byte; and configure the seventh bit of each encoded data byte as equal to the eighth bit of each respective encoded data byte when the third bit of the respective encoded data byte is zero; configure the seventh bit of each encoded data byte as equal to the fifth bit of each respective encoded data byte when the third bit of the respective encoded data byte is one; and pass each encoded data byte as part of the four parallel outputs of encoded data to the word-serializing circuitry.

In one implementation, the physical layer interface is further configured to obtain from the physical layer of the Ethernet link, a second input of data in compliance with the second interface protocol. The communication interface further comprises word-aligning circuitry configured to align the second input of data into four parallel streams of data, and word-decoding circuitry configured to map the four parallel streams of data into one data stream of data in compliance with the first interface protocol. The aligning includes using DIC to enforce a start of packet of each of the four parallel outputs of data on byte 0.

In one implementation, the word-encoding circuitry is further configured to abandon every other first sequence ordered set in the input of data, and include a variable in the input of data to track whether to abandon a next sequence ordered set in the input of data.

In one implementation, the word-encoding circuitry is further configured to pass the second sequence-ordered set based at least in part on a transmission state diagram specified in IEEE 802.3z standard with added sequence-ordered set configuration operations.

BRIEF DESCRIPTION OF THE DRAWINGS

Further features of the disclosure, its nature and various advantages will become apparent upon consideration of the following detailed description, taken in conjunction with the accompanying drawings, in which like reference characters refer to like parts throughout, and in which:

FIG. 1 is a block diagram illustrating implementations from various suppliers running 1000BASE-X at 2.5 Gb/s, according to some embodiments described herein;

FIGS. 2-4 show example block diagrams illustrating various compatibility scenarios of 2.5-Gigabit Ethernet on the PHY layer, according to some embodiments described herein;

FIG. 7 provides an example table 500 illustrating the mapping from four bytes of 2.5GPII data 315 to XGMII data 316 at the word decoder 307, according to some embodiments described herein;

DETAILED DESCRIPTION

This disclosure describes methods and systems for a sequence-ordered set mapping scheme that maps the sequence-ordered set under an Ethernet interface protocol to a new sequence-ordered set under another Ethernet interface protocol in a way such that data transmission between two linking partners that are operated under the two different Ethernet interface protocols can be compatible.

Figure 4:
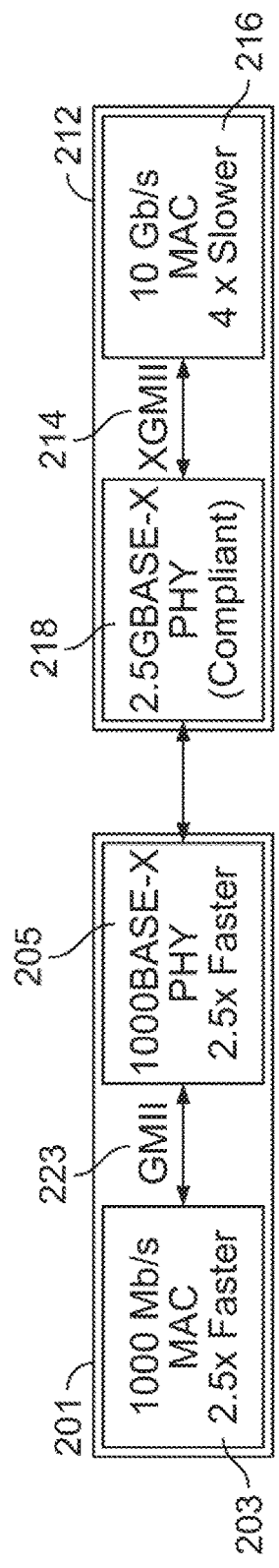

Specifically, a sequence-ordered set mapping scheme is provided for 2.5-Gigabit Ethernet over optical fiber to address a compatibility issue of a Gigabit Media-Independent Interface (GMII) based 1 Gb/s MAC running 2.5 times faster to achieve 2.5-Gigabit Ethernet and interacting with a 10-Gigabit Media-Independent Interface (XGMII). For example, to achieve Ethernet at a transmission rate of 2.5 Gb/s, the PHY of an Ethernet device is configured, in an embodiment, to transmit data bits at 2.5 Gb/s, and correspondingly, the MAC layer of the Ethernet device needs to be configured to process data bits at 2.5 Gb/s as well. An existing 2.5-Gigabit implementation includes scaling up the Gigabit MAC 2.5 times faster under a compliant 2.5GBASE-X, which uses the 2.5 Gb/s PCS Intermediate Interface (2.5GPII). However, the existing IEEE 802.3bz standard chooses a scaled-down 10-Gigabit MAC running 2.5 times slower to achieve 2.5-Gigabit Ethernet, which implies that XGMII shall be used. The compatibility issue is illustrated in FIG. 4, where compliant 2.5BASE-X PHY 218 using 2.5GPII needs to interact with a 10-Gigabit MAC 212 running 2.5 times slower using XGMII. Therefore a mechanism has to be provided to make different layers of 2.5-Gigabit Ethernet operated under different interface protocols interoperable.

To address this compatibility issue (e.g., as illustrated in FIG. 4), processing circuitry (e.g., see components 303, 305, 306 and 307 in FIG. 5) for a compatible backplane operation mechanism is provided at a reconciliation layer (e.g., see 330 in FIG. 5) that is disposed between the PHY and the MAC layers to translate data into a compatible medium-independent interface format, as further discussed in connection with FIGS. 5-7. Specifically, a 4-byte word serializer/alignment module (e.g., 305 and 307 in FIG. 5) can be used to convert data between the XGMII format that is used by the MAC operated 2.5 times slower of 10-Gigabit and the 2.5GPII format that is used by 2.5BASE-X Ethernet, with deficit idle counting as further illustrated in Table 1.

In particular, embodiments described herein provide a novel sequence-ordered set mapping scheme (as illustrated in the mapping tables in FIGS. 6-7), which is implemented, in an embodiment, at the word encoder or decoder (e.g., 303 or 307 in FIG. 5), to map the sequence-ordered set for an XGMII frame to a sequence-ordered set for a 2.5GPII frame, and vice versa. For example, a four-byte sequence-ordered set for XMGII data that takes a form of "Sequence, Data X, Data Y and Data Z" is translated to an eight-byte 2.5GPII sequence ordered set that takes a form of "Sequence, Data $S_0$, Sequence, Data $S_1$, Sequence, Data $S_2$, Sequence, Data $S_3$." Detailed bit configuration of the sequence-ordered set mapping is discussed in connection with FIGS. 6-7. Specifically, the sequence-ordered set mapping avoids certain lines codes as illustrated in Table 3. The encoded/decoded data with the ordered set mapping is then serialized/aligned such that Ethernet data bytes transmitted in a format designed for a higher data rate (e.g., 2.5GBASE-X) can be received or transmitted in a compatible manner under 1000BASE-X. Ordered set passing for the proposed ordered set mapping scheme (discussed in connection with FIGS. 6-7) can be accomplished with the transmission state diagrams specified in the current IEEE 802.3z standard with added sequence-ordered set operations, as discussed in connection with FIGS. 9-11.

Therefore, in this way, existing equipment originally designed for 1000BASE-X is re-used for 2.5 Gb/s Ethernet in a compatible way with other devices operated under 2.5GBASE-X. The maintenance or upgrade cost of the network infrastructure is thus reduced.

FIG. 1 is a block diagram illustrating example implementations of running a 1000BASE-X network at 1000 Mb/s or 2.5 Gb/s, according to some embodiments described herein. In an existing 1000BASE-X network 100a, the MAC layer 101a transmits data at 1000 Mb/s, and interfaces with a corresponding 1000BASE-X PHY 102a via a gigabit media-independent interface 103a. Thus, the PHY 102a transmits data 104a at a data rate of 1000 Mb/s, or, equivalently, a baud rate of 1.25 Gb/s. When the 1000BASE-X network is running at a 2.5-time speed, as shown at 100b, the MAC layer 101b transmits data 2.5 times faster, and, accordingly, the PHY 102b needs to handle data 2.5 times faster in order to support a PHY transmission 104b data rate of 2500 Mb/s, or, equivalently, a baud rate of 3.125 Gb/s. The GMII 103b then also needs to be operated 2.5 times faster to achieve the data rate of 2500 Mb/s. Thus, the 2.5G PCS needs to be re-defined to make a reconciliation sublayer under GMII compatible with a reconciliation sublayer under XGMII.

In addition to the compatibility issue between GMII-based 1G MAC running at 2.5 Gb/s and interacting with an XGMII, various issues need to be considered to provide a compatible design of a 2.5G backplane for 1000BASE-X devices. For example, a legacy PCS (e.g., a 1000BASE-X PCS) needs to turn off Clause 37 Auto-Negotiation in order to interoperate with a compliant 2.5GBASE-X PCS. In another example, Clause 73 parallel detect support needs to be made mandatory for the 2.5G backplane, as a device with PHY auto-negotiation turned on is configured to detect 2.5G signals from a linking partner, stop the auto-negotiation process, and then proceed to link in 2.5G Ethernet even when the linking partner has PHY auto-negotiation turned off. In another example, when an energy-efficient Ethernet (EEE) is enabled using IEEE 802.3 Clause 73 auto-negotiation, but parallel detect link-up is not supported by the EEE, the EEE needs to be manually enforced and such manually-enforced EEE needs to be specified by the 1000BASE-X standard. The proposed compatible design of a 2.5G backplane for 1000BASE-X devices as described herein address the above non-limiting example compatibility issues.

FIGS. 2-4 show example block diagrams illustrating various scenarios of 2.5G Ethernet on the PHY layer, according to some embodiments described herein. FIG. 2 shows a legacy-PHY-to-legacy-PHY scenario. In FIG. 2, much like the device 100b in FIG. 1, a 1000BASE-X device 201 and the link partner 202, each operate at a speed 2.5 times faster than 1000 Mb/s as prescribed in 1000BASE-X on the MAC layers 203 and 204, respectively. Thus, the PHYs 205 and 206 of both devices are operated 2.5 times faster under the existing 1000BASE-X standard, in an embodiment.

FIG. 3 shows a compliant-PHY-to-compliant-PHY scenario. In FIG. 3, when the MAC 215 or 216 and the PHY 217 or 218 in each device 211 or 212 communicates via XGMII, the MAC 215 or 216 is viewed as operating four times slower than 10 Gb/s (the data rate under XGMII). In this case, both PHYs 217 and 218 are operated under the same compliant 2.5GBASE-X standard. Here, a sequence- or signal-ordered set that a 10 Gb/s MAC is capable of sending is introduced at each PHY 217 or 218, in an embodiment.

FIG. 4 shows a legacy-PHY-to-compliant-PHY scenario. In FIG. 4, the device 201 is operated under 1000BASE-X at a data rate 2.5 times faster than 1000 Mb/s on MAC 203, and thus the PHY 205 is operated 2.5 times faster under 1000BASE-X. The linking partner device 212 is operated as a four times slower than 10 Gb/s on MAC 216, and the PHY 218 is a compliant PHY operated under 2.5GBASE-X, in an embodiment. Thus a compatibility issue exists between the linking partner device 201 and the linking partner device 212, for example, as the device 201 speeds up the GMII 223 to 2.5 times faster, but linking partner device 212 uses 2.5GPII as the interface standard for a compliant PHY at 218.

In some implementations, an MII is used as a reference for the reconciliation sublayer. Physical implementation of the MII, e.g., a fixed MII placed between the MAC and PHY as a fixed point of reference is optionally used.

As shown in FIG. 4, as the XGMII 214 transmits four bytes of data per clock cycle, and the GMII 223 transmits one byte of data per clock cycle, the compliant PHY 218 needs to compensate for a non-four-byte alignment. For example, the one-byte transmission from GMII 223 needs to be aligned with the four-byte transmission from XGMII 214 at the start of each data packet. To align the non-four byte data transmission, the compliant PHY 218 passes a sequence- or signal-ordered set that does not interfere with the legacy PHY 205, in an embodiment. For example, the XGMII-based MAC 216 passes the /Q/ ordered sets (e.g., an ordered set defined in IEEE 802.3 standard), but the GMII-based MAC 203 does not need to pass any ordered set, as defined by the XGMII and GMII protocols. Further description of the sequence ordered set is provided below in connection with Table 2.

The passing sequence, or signal-ordered set, is configured by the reconciliation sublayer (e.g., see 330 in FIG. 5) between the MAC and the PHY, at which the IEEE 802.3bz XGMII is used as the reference for sequence ordered set passing. In this way, a 2.5 Gb/s PCS Intermediate Interface (2.5GPII) is used as an internal function interface. The 2.5GPII has been achieved with the exact same pin mapping as a full duplex GMII, with no carrier sense (CRS) or collision detect (COL) signals, but is configured to operate 2.5 times faster than the GMII, with additional coding specified by 2.5GPII to generate a single K28.5 symbol that is not used in GMII. The K28.5 symbol is used at the beginning of every four-byte sequence (e.g., the ordered set) that perform functions such as loop arbitration, fill words, link resets, or the like in optical fiber channels.

Figure 5:
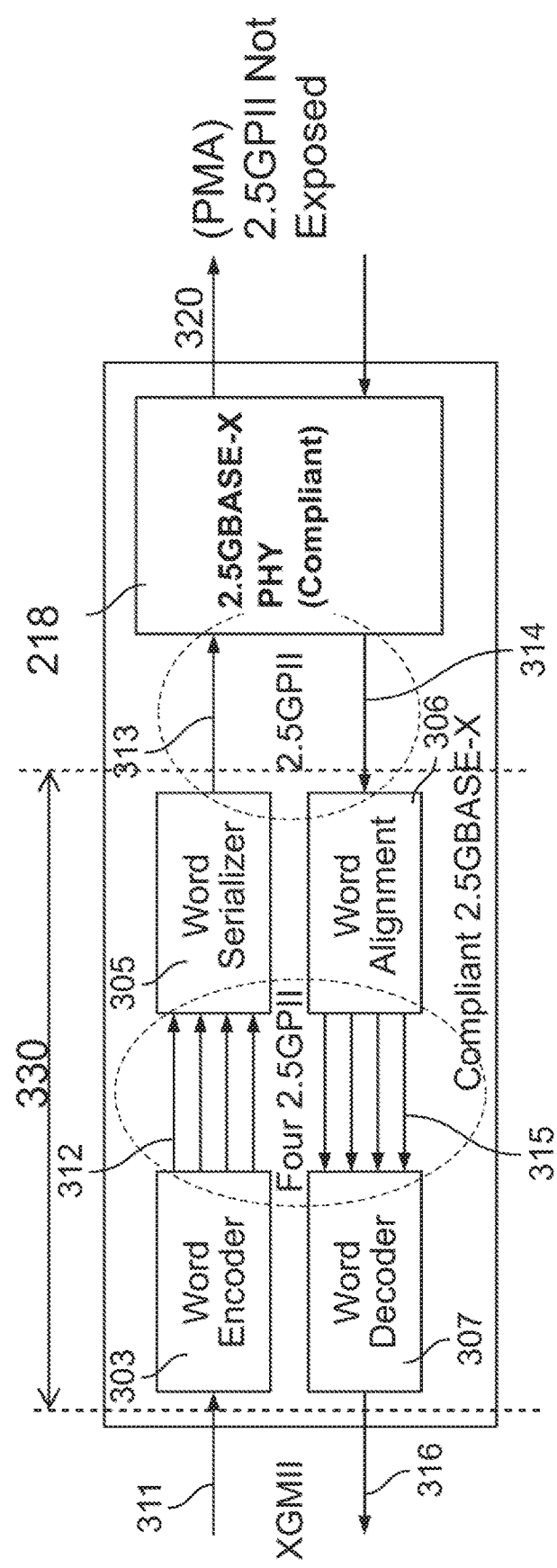
FIG. 5 shows an example block diagrams illustrating a structure of the physical coding sublayer (PCS) converting 10-Gigabit Media-Independent Interface (XGMII) to the 2.5GBASE-X physical medium attachment (PMA) sublayer, according to some embodiments described herein.

FIG. 5 shows an example block diagram illustrating a structure of the PCS for reconciling different MIIs, according to some embodiments described herein. The 1000BASE-X PCS is modified to pass /Q/ and /Fsig/ ordered sets (i.e., ordered sets defined in IEEE 802.3 standard). Portions of the state machine in 1000BASE-X PCS that supports IEEE 802.3 Clause 37 auto-negotiation is disabled or removed. Specifically, i the /Q/ and /Fsig/ ordered sets are to be blocked and sent as idles, a variable is configured to set to disable the IEEE 802.3 Clause 37 auto-negotiation. Further illustration of the state machine modification is found in FIGS. 9-11.

A word encoder 303 (and correspondingly a word decoder 307) and a word serializer 305 (and correspondingly a word alignment module 306) are added to the PCS. The word encoder 303 is configured to interface with an XGMII and map XGMII-formatted data 311 into an internal 2.5GPII-formatted data 312. The word decoder 307 in turn maps 2.5GPII data 315 into an XGMII format 316, in an embodiment. The word serializer 305 converts the four-byte 2.5GPII data 312 to one-byte 2.5GPII data 313 for the compliant 2.5GBASE-X PHY 218 in an example. The word alignment module 306 in turn receives 2.5GPII data 314 from the PHY 205 and aligns the one-byte 2.5GPII data 314 into four-byte data 315. The PHY 218 then transmits or receives data to the PMA sublayer 2.5 times faster than the data rate specified in 1000BASE-X, PMA without exposing any 2.5GPII data to PMA.

The word serializer 305 takes an input of four bytes of 2.5GPII data 312 and generates an output of one byte of 2.5GPII data 313 at a time. For the word alignment module 306, as XGMII operates four-bytes at a time and requires a Start of Packet (SoP) be on byte 0, but 2.5GPII operates one-byte at a time, grouping four-bytes of XGMII data sometimes does not guarantee the SoP be on a byte 0. Deficit idle counting (DIC) is used in IEEE 802.3 Clause 46.3.1.4 to align the SoP. For example, in an embodiment, the DIC configuration for four bytes of XGMII data takes a form similar to the following:

TABLE 1

Example DIC Configuration

| Deficit | SoP on byte 0 | SoP on byte 1 | SoP on byte 2 | SoP on byte 3 |
|---|---|---|---|---|
| 0 byte | Do nothing | Delete 1 idle byte | Delete 2 idle bytes | Delete 3 idle bytes |
| 1 byte | Do nothing | Delete 1 idle byte | Delete 2 idle bytes | Insert 1 idle byte |
| 2 byte | Do nothing | Delete 1 idle byte | Insert 2 idle bytes | Insert 1 idle byte |
| 3 byte | Do nothing | Insert 3 idle bytes | Insert 2 idle bytes | Insert 1 idle byte |

The DIC mechanism is also extended to align other data packets to byte 0 if necessary, for example, the first low power idle when transitioning in from idles, the start of ordered sets, or the like. When DIC is applied to the start of ordered sets, an error condition occurs as the ordered set can only be generated from the XGMII interface, which should already be aligned.

The word encoder 303 translates XGMII data 311 to four bytes of 2.5GPII data 312 in an embodiment. Specifically, at the word encoder 303, the sequence-ordered set in the XGMII data 311 is mapped to a new sequence-ordered set added to the 2.5GPII data 312. A sequence-ordered set mapping scheme is adopted, in an embodiment, to translate the sequence-ordered sets in compliance with two different interface protocols. A 2.5GPII transmitting packet takes a form similar to the following:

TABLE 2

Example Data Structure of 2.5 GPII Tx Frame

| TX_EN | TX_ER | TXD[7:0] | Description |
|---|---|---|---|
| 0 | 0 | xx | Idle |
| 0 | 1 | 0x01 | Low Power Idle |
| 0 | 1 | 0x0F | Carrier Extend - Not used |

TABLE 2-continued

Example Data Structure of 2.5 GPII Tx Frame

| TX_EN | TX_ER | TXD[7:0] | Description |
|---|---|---|---|
| 0 | 1 | 0x1F | Carrier Extend Error - Not used |
| 1 | 0 | 00 to FF | Data |
| 1 | 1 | xx | Transmit Error |
| 0 | 1 | 0x9C | Sequence |

The ordered sequence set, as shown in the last row of Table 2, signals the status of the physical link, and includes four bytes of data for XGMII, or expands from four bytes to eight bytes.

To expand the sequence ordered set from four bytes to eight bytes, every other sequence ordered set on XGMII is configured to be abandoned. Very little information would be missed by abandoning the sequence ordered set on XGMII because the ordered set usually repeats for a number of words. In fact, more than 90% of the sequence order sets in XMGII are normally abandoned in 10GBASE-X4. A previous sequence variable is used to track whether the next sequence order set is to be abandoned on XGMII. The ordered set transmission is truncated if any byte other than a sequence ordered set is mistakenly abandoned. Example translation from XGMII data to four bytes of 2.5GPII data including a proposed sequence code mapping scheme is illustrated in the table 400 in FIG. 6.

Figure 6:
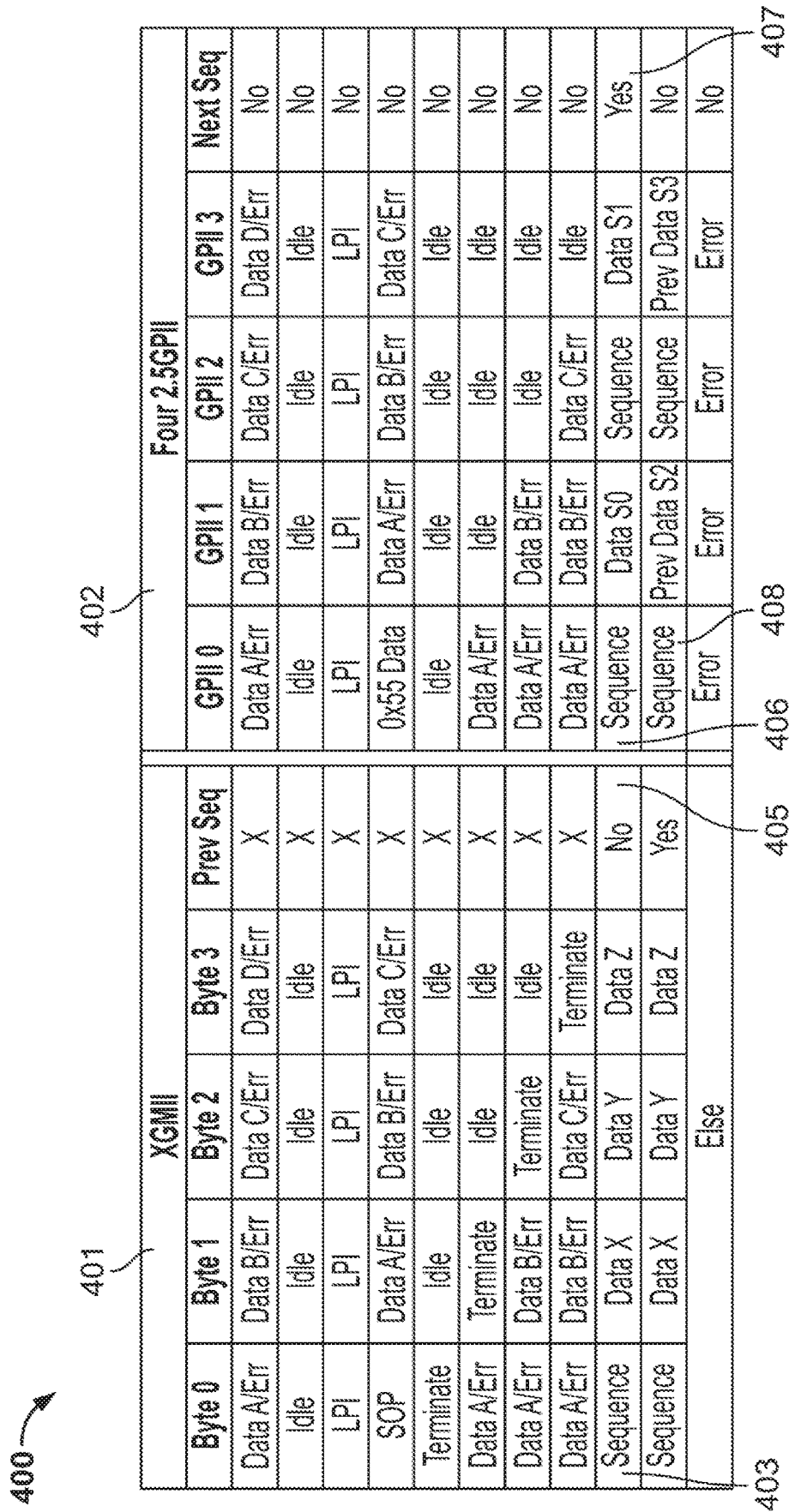
FIG. 6 shows an example table illustrating translation from XGMII data to four bytes of 2.5GPII data, according to some embodiments described herein.

As shown at 403 in FIG. 6, the sequence ordered set on XGMII is transmitted followed by data bytes Data X, Data Y and Data Z, and a variable Prev_Seq 405 that indicates whether the previous word contains a sequence ordered set. To map the four bytes Sequence, Data X, Data Y and Data Z on XGMII to four bytes of 2.5GPII data, a corresponding sequence order set is included for 2.5GPII. For example, at 406, a 2.5GPII sequence ordered set is configured in a format of "Sequence, Data $S_0$, Sequence, Data $S_1$," and a variable Next_Seq is introduced to indicate whether the next word is a sequence ordered set; and the Data $S_0$ corresponds to Data X in XGMII, and the Data $S_1$ corresponds to Data Y in XGMII. At 408, the 2.5GPII data is configured in a format of "Sequence, previous Data $S_2$, Sequence, previous Data $S_3$," where the Data $S_2$ corresponds to Data Y in the previous word on XGMII, and the Data $S_3$ corresponds to Data Z in the previous word on XGMII.

Returning to FIG. 5, the word decoder 307 translates four bytes of 2.5GPII data 315 to XGMII data 316, in an embodiment. FIG. 7 provides an example table 500 illustrating the mapping from four bytes of 2.5GPII data 315 to XGMII data 316 at the word decoder 307, according to some embodiments described herein. In the 2.5GPII data, a previous-word variable 501 and a next-word variable 502 is configured for state-dependent mapping. Data statuses on 2.5GPII, such as false carrier, carrier extend error, and out of place carrier extend, are converted to errors on XGMII. When the physical link is down, then the XGMII outputs a local fault-ordered set.

As shown in FIG. 7, at 503, a 2.5GPII sequence ordered set "Sequence, Data $S_0$, Sequence, Data $S_1$," is translated as part of the XGMII sequence ordered set at 506 and 508 as "Sequence, Data X, Data Y and Data Z" (four bytes). The translation is configured to look ahead to obtain 2.5GPII sequence ordered sets at 504 and 505 to check $S_0$, $S_1$, $S_2$, $S_3$ bits. At 504, when the 2.5GPII ordered set has the Next Word byte indicating it is not sequence $S_2$, $S_3$, the instant 2.5GPII word is discarded, and thus the corresponding XGMII is idle at 507.

Returning to FIG. 5, example XMGII sequence ordered set at 311 takes a form similar to "Sequence, Data X, Data Y and Data Z" (four bytes); example 2.5GPII sequence ordered set at 313 takes a form similar to "Sequence, Data $S_0$, Sequence, Data $S_1$, Sequence, Data $S_2$, Sequence, Data $S_3$"; and the example output of the PCS under 2.5GPII, e.g., at 320 in FIG. 5, takes a form similar to the following: K28.5, W0, K28.5, W2, K28.5, W3. The sequence ordered set without the /Q/ takes a form similar to /K28.5/W/K28.5/W/K28.5/W/K28.5/W/. A truncated sequence ordered set with fewer than eight symbols takes a form similar to /K28.5/W/K28.5/W/. The signal-ordered set without/Fsig/ takes a form similar to /K28.5/W/K28.5/W/K28.5/W/K28.5/W/, with different /W/ being sent. Here XGMII does not indicate /Fsig/ but uses provisions in 10GBASE-X4 or 10GBASE-R to send /Fsig/.

Specifically, the word encoder 303, in one embodiment, is configured to configure bits of the sequence-ordered set in the 2.5GPII data 312 in a way such that each resulting encoded data byte is to be transmitted as part of the 2.5GPII data. In one example, the sequence-ordered set is configured as, $S_0[7]=S_3[7]=0$, $S_1[7]=S_2[7]=1$ for a /Q/ ordered set. As another example, $S_1[7]=1$, $S_0[7]=S_2[7]=S_3[7]=0$ is configured for a /Fsig/ ordered set. In this case, $S_0[7]$ and $S_1[7]$ can be set with opposite values for ordered set alignment; e.g., if $S_0[7]$, $S_1[7]$, $S_2[7]$, $S_3[7]$=0110 or 0100, the "01" pattern is used to align the ordered set bytes.

As another example, the word encoder 303 is configured to map the XGMII ordered set to 2.5GPII ordered set (as shown in FIGS. 6-7) based at least in part on the following: $S_0[5:0]$=Data X[5:0]; $S_1[5:0]$=Data Y[3:0]; Data X[7:6]; $S_2[5:0]$=Data Z[1:0], Data Y[7:4]; $S_3[5:0]$=Data Z[7:2]; . . . $S_n[6]=S_n[7]$ if $S_n[2]=0$, or $S_n[6]=S_n[7]$ if $S_n[2]=1$, where n is a positive integer greater than 1.

The /W/ ordered set is the set of 10-bit data ordered sets that can be encoded from the 128 possible values of S. The 8b/10b line code for six K28.5 Dx.y data codes to avoid is illustrated in the following table, e.g., the sixth bit is configured to be the same as the seventh bit or the fifth bit to achieve the following:

TABLE 3

The 8b/10b Codes to Avoid

| Function | Data Code | Octet | 7 | 6 | 5 | 4 | 3 | 2 | 1 | 0 |
|---|---|---|---|---|---|---|---|---|---|---|
| Idle | D5.6 | C5 | 1 | 1 | 0 | 0 | 0 | 1 | 0 | 1 |
| Idle | D16.2 | 50 | 0 | 1 | 0 | 1 | 0 | 0 | 0 | 0 |
| LPI | D6.5 | A6 | 1 | 0 | 1 | 0 | 0 | 1 | 1 | 0 |
| LPI | D26.4 | 9A | 1 | 0 | 0 | 1 | 1 | 0 | 1 | 0 |
| Config | D21.5 | B5 | 1 | 0 | 1 | 1 | 0 | 1 | 0 | 1 |
| Config | D2.2 | 42 | 0 | 1 | 0 | 0 | 0 | 0 | 1 | 0 |

Figure 8:
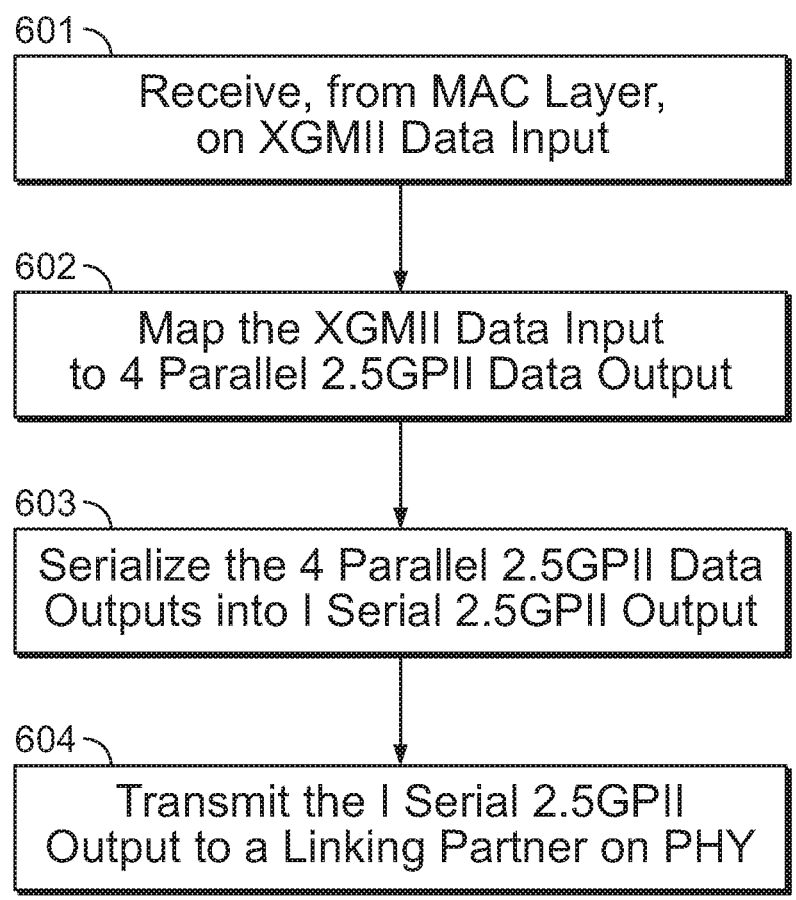
FIG. 8 shows an example logic flow diagram illustrating aspects of providing a compatible backplane operation mechanism for 2.5-gigabit high-speed Ethernet, according to some embodiments described herein.

FIG. 8 shows an example logic flow diagram illustrating aspects of providing a compatible backplane operation mechanism for 2.5-gigabit high-speed Ethernet, according to some embodiments described herein. At 601, a reconciliation layer (e.g., see 330 in FIG. 5) between the PHY and the MAC layer of an Ethernet communication interface receives, from the MAC layer of the Ethernet link, an XGMII data input (e.g., see XGMII data 311 in FIG. 5). At 602, the XGMII data input is mapped or encoded into four parallel outputs of 2.5GPII data (e.g., see 2.5GPII data 312 in FIG. 3). The mapping is further discussed in FIG. 6. The sequence ordered set on XGMII is expanded from four bytes to eight bytes on 2.5GPII during the mapping. At 603, the four parallel 2.5GPII data outputs are serialized into one serial 2.5GPII output, e.g., by taking four 2.5GPII bytes and sending it out one 2.5GPII byte at a time. At 604, the one serial 2.5GPII output is transmitted on PHY of an Ethernet link, to a linking partner. Thus, the 2.5GPII output is transmitted out on the PHY at a data rate of 2.5 Gb/s, which is 2.5 times faster than the data rate of 1000 Mb/s specified in the 1000BASE-X standard.

Figure 9A:
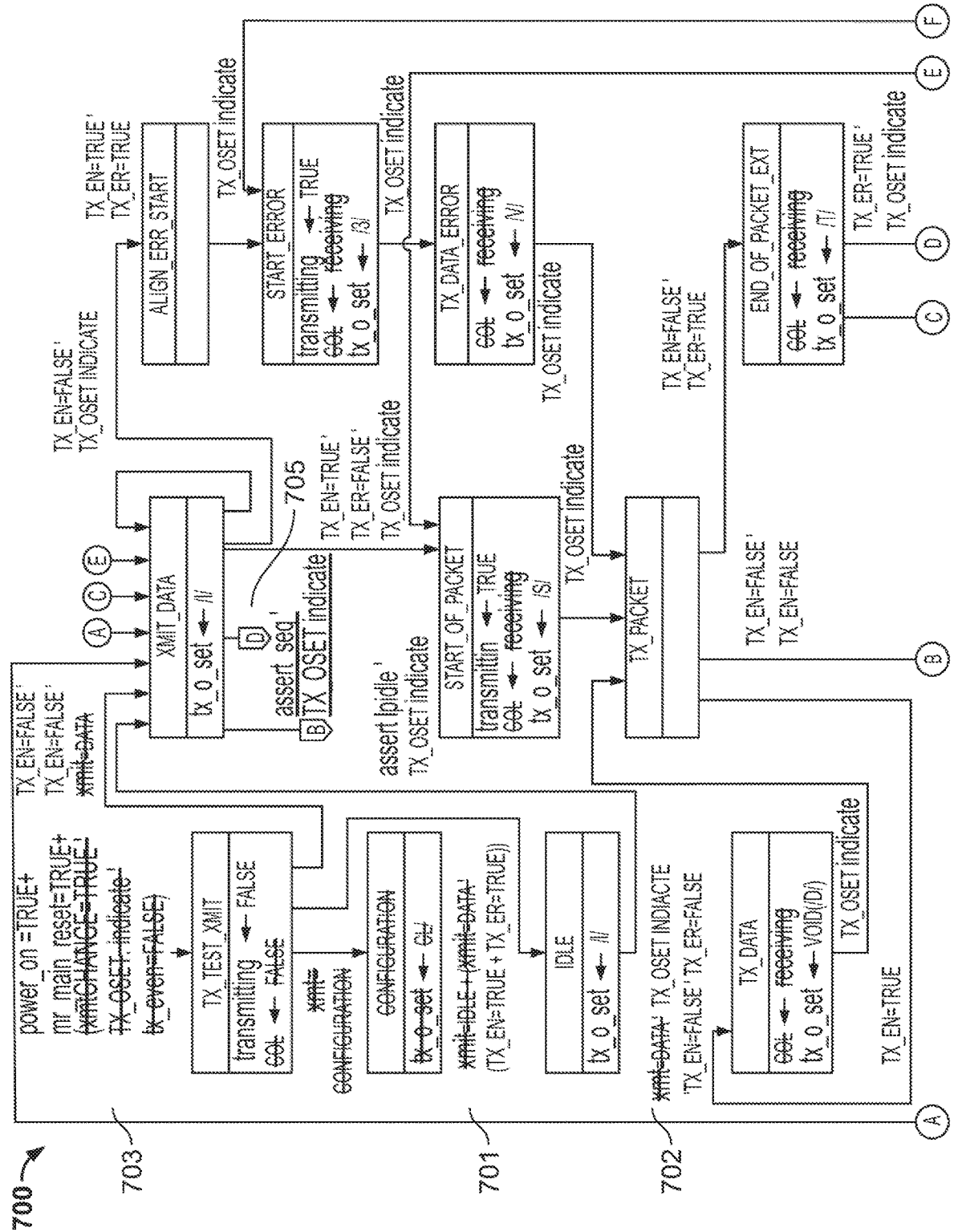
FIGS. 9A-9B (hereinafter collectively referred to as "FIG. 9"), FIGS. 10A-B (hereinafter collectively referred to as "FIG. 10") and FIGS. 11A-B (hereinafter collectively referred to as "FIG. 11") provide example flow diagrams illustrating example modifications to the IEEE 1000BASE-X PCS state diagrams for sequence-ordered set passing as discussed in Tables 1-2, according to some embodiments described herein.
Figure 9B:
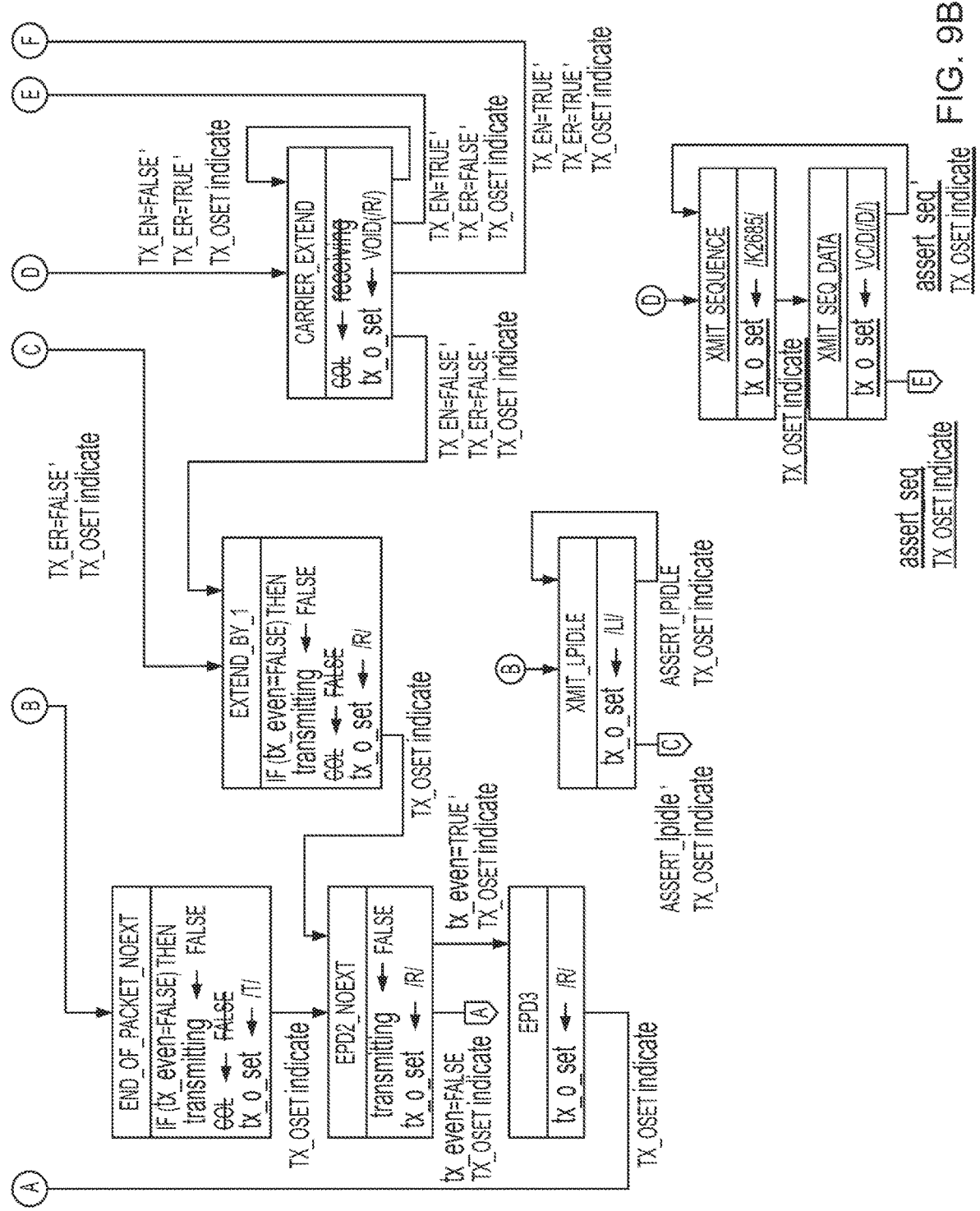
Figure 10A:
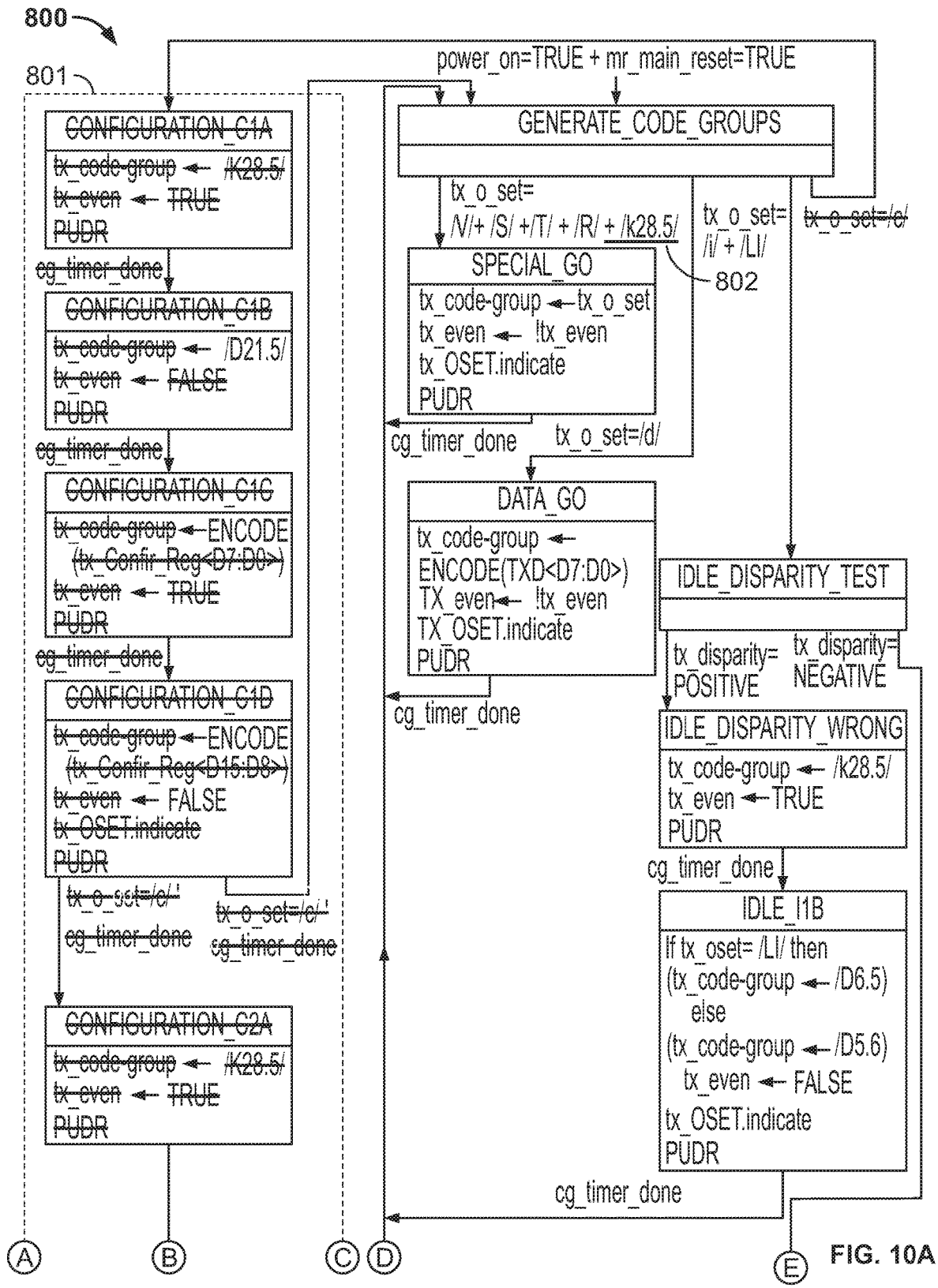
Figure 10B:
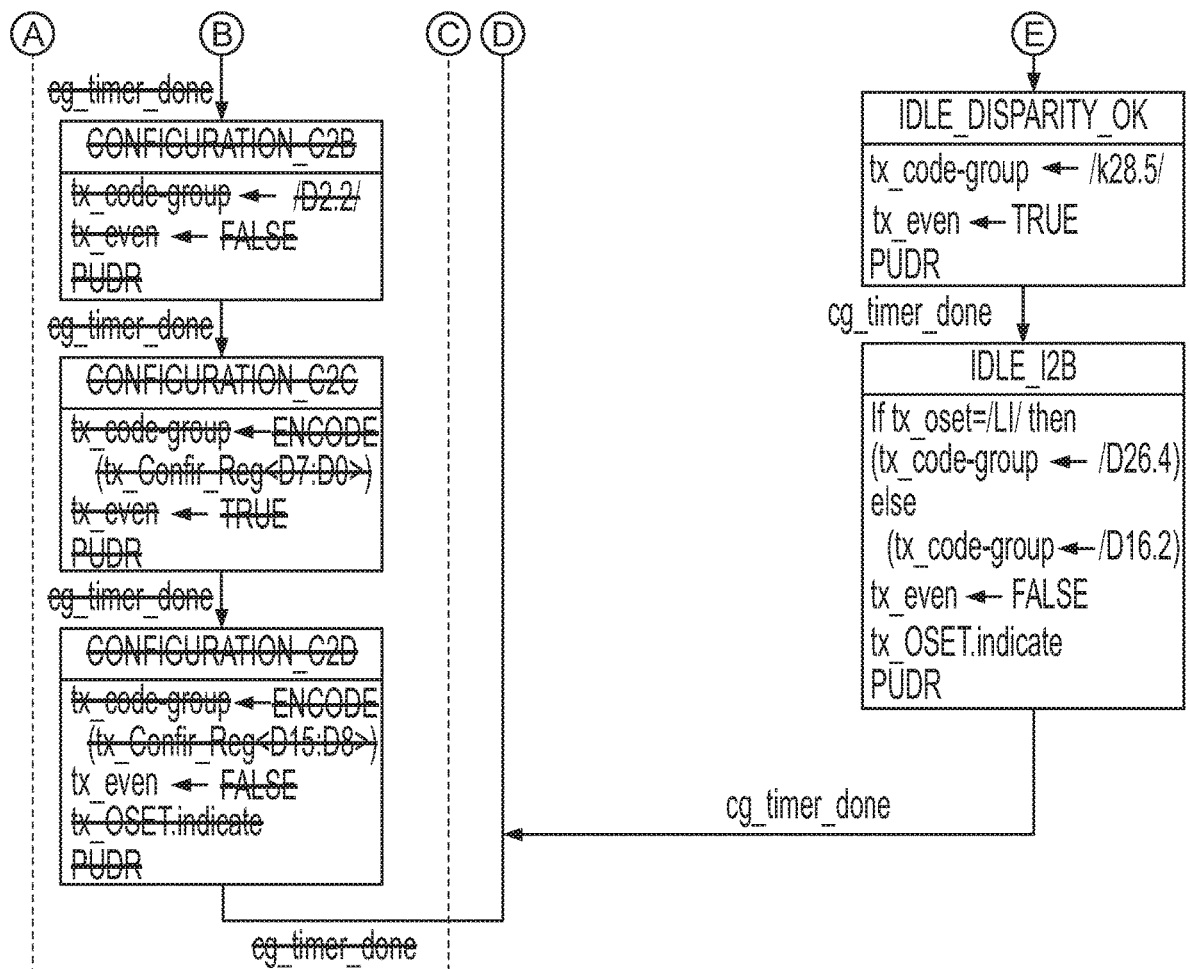
Figure 11A:
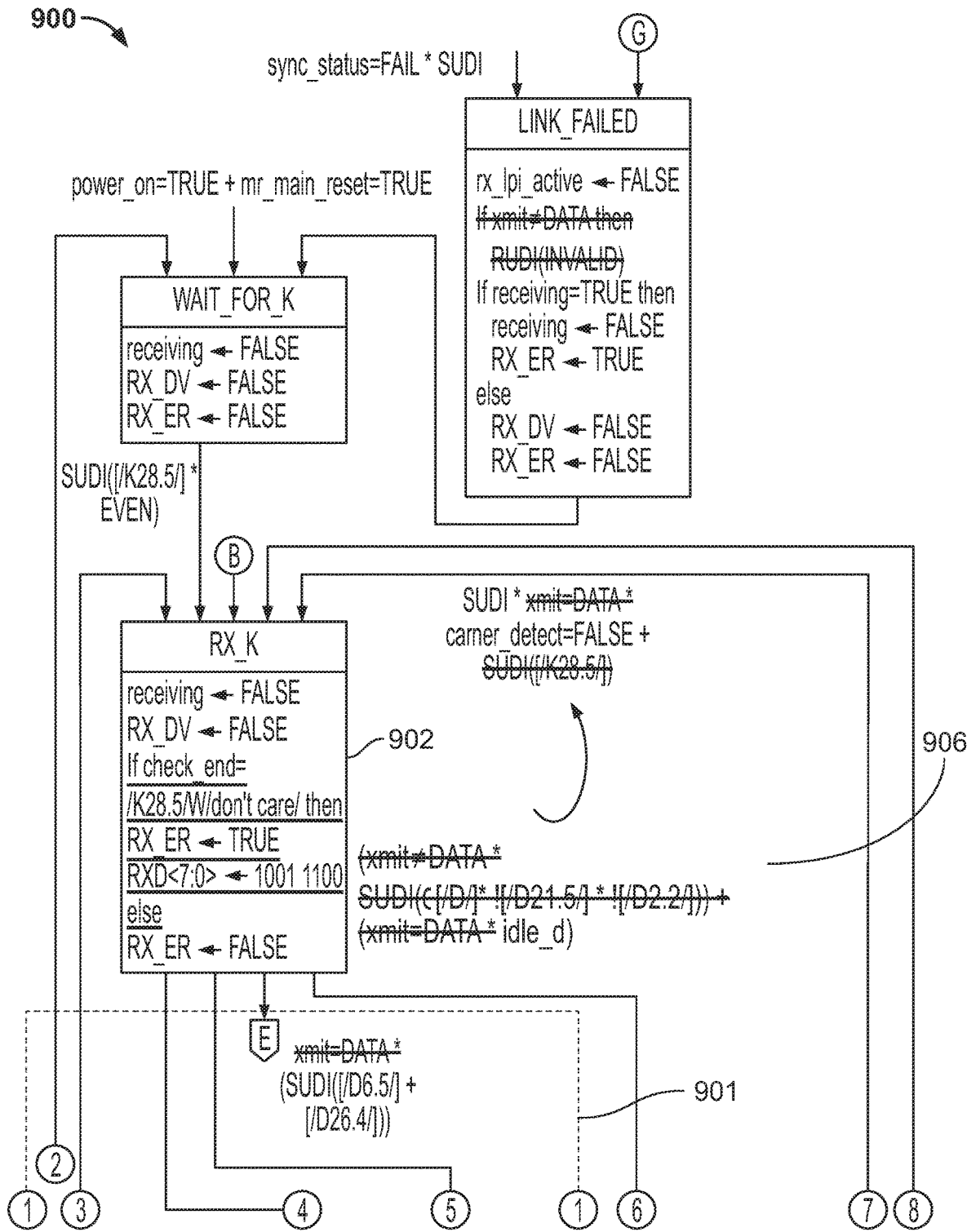
Figure 11B:
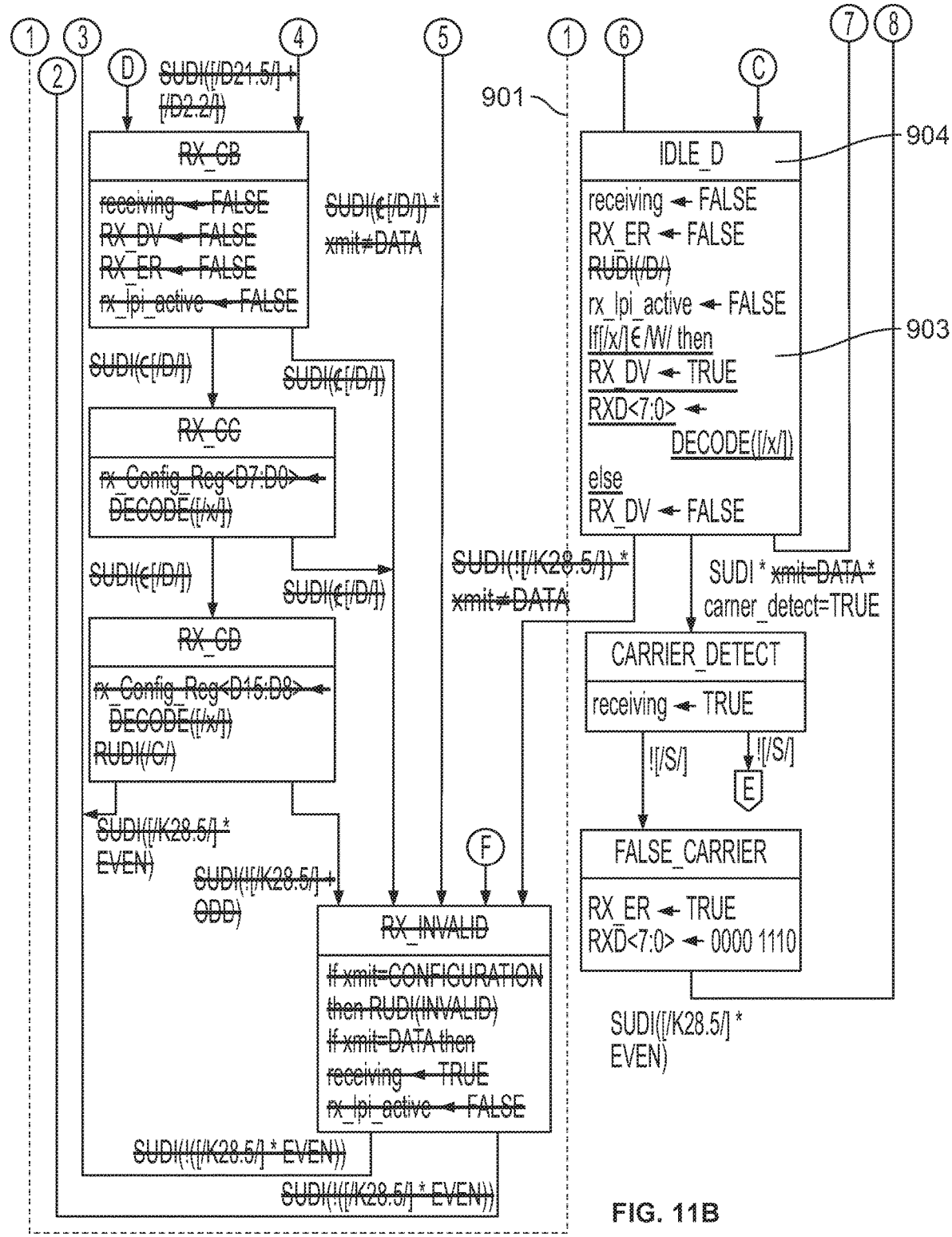

FIGS. 9-11 provide example flow diagrams illustrating example modifications to the IEEE 1000BASE-X PCS state diagrams with a sequence ordered set as discussed in Tables 1-3, according to some embodiments described herein. The PCS transmit process can be depicted by the diagrams in FIG. 9 that are related to a PCS transmit-ordered set (modified from FIG. 36-5 specified in the IEEE 802.3 standard), FIG. 10 that is related to a PCS transmit code-group (modified from FIG. 36-6 specified in the IEEE 802.3 standard), and FIG. 11 that is related to a PCS receive-ordered set (modified from FIG. 36-7a specified in the IEEE 802.3 standard). The configuration-ordered set used to support IEEE 802.3 Clause 37 auto-negotiation is configured to be disabled, e.g., the related portion of the state machine is deleted from the IEEE 802.3 state machine diagram. Or alternatively, such portion is disabled by forcing parameter xmit=DATA. Meanwhile, additional elements are configured to be added to the state machine diagram to support /Q/ and /Fsig/ ordered set.

In FIG. 9, the transmit-ordered set process as shown at diagram 700 is configured to continuously source ordered sets to the transmit code-group process (shown at 800 in FIG. 10). For example, upon the assertion of tp_en by the 2.5GPII, the SPD ordered set is sourced. Following the SPD, /D/ code-groups are sourced until tp_en is de-asserted. Following the de-assertion of tp_en, EPD ordered sets are sourced. If tp_en and tp_er are both de-asserted, the /R/ ordered set is sourced, after which the sourcing of /I/ is resumed. If, while tp_en is asserted, the tp_er signal is asserted, the /V/ ordered set is sourced except when the SPD ordered set is selected for sourcing. If the 2.5GPII indicates sequence then /Q/ ordered sets are sourced. If the optional EEE is enabled and the 2.5GPII indicates low power idles then /LI/ ordered sets are sourced.

In FIG. 10, the Transmit code-group process as shown at 800 is configured to continuously sources tx_code-group<9:0> to the PMA based on the ordered sets sourced to it by the Transmit ordered set process. The Transmit code-group process determines the proper code-group to source based on even/odd-numbered code-group alignment, running disparity requirements, and ordered set format.

Operations related to a configuration-ordered set are configured to be deleted from the 1000BASE-X PCS transmit-ordered set state diagram (FIG. 36-5 specified in the IEEE 802.3 standard) 700, e.g., as shown at the portions 701-703 that are struck through. At 700, operations that are struck through are removed from the state diagram, and operations that are underlined are added to the state diagram to set the sequence ordered set. A new variable assert_seq 705 is added to the state diagram, which is an alias used for the sequence ordered set, including the following terms: (TX_EN=FALSE*TX_ER=TRUE*(TXD<7:0>=0x9C) The constant /Q/ is used for the sequence ordered set. A properly formed sequence ordered set appears as /K28.5/W/K28.5/W/K28.5/W/K28.5/W/, and a truncated sequence ordered set appears as/K28.5/W/K28.5/W/. The constant /W/ is used as the set of 128 code-groups that is generated by ENCODE (s<7:0>), where for all 128 possible values of x<6:0>, s<7>=x<6>, s<5:0>=x<5:0>, s<6> is set to x<5> when x<2>=1 and s<6> is set to x<6> when x<2>=0. /W/ is a subset of /D/ (e.g., ordered sets defined in IEEE 802.3 standard).

FIG. 10 shows modifications to the 1000BASE-X PCS transmit code group state diagram (indexed as FIG. 36-6 specified in the IEEE 802.3 standard) 800. Operations (e.g., diagram 801 that is related to the Clause 37 auto-negotiation configuration) that are struck through is removed from the state diagram, and data code /K28.5/ is added at 802.

FIG. 11 shows modifications to the 1000BASE-X PCS receive state diagram (indexed as FIG. 36-7a specified in the IEEE 802.3 standard) 900. Operations (e.g., diagram 901 that is related to the Clause 37 auto-negotiation configuration) are struck through as removed from the state diagram, and new operations 902-903 related to decoding sequence ordered set, which are underlined, is added to the state diagram. Specifically, for the variable idle d 904, which is the alias for the following terms: SUDI(![/D21.5/]*![/D2.2/]) UCT, the alternate form is used to support the EEE capability SUDI(![/D21.5/]*![/D2.2/]*![/D6.5/]*![/D26.4/]).

Additionally, other 1000BASE-X state diagrams are further modified. For example, for FIG. 36-7b, the PCS receive state diagram in 1000BASE-X, the packet handling portion of the state machine is removed, while the sequence ordered set handling remains the same. If the configuration-ordered set handling is not implemented, then transition to D is removed, and transition to C is simply SUDI.

For another example, for the PCS receive state diagram in 1000BASE-X (indexed as FIG. 36-7c in the 1000BASE-X standard), the low power idle portion of the state machine is removed, while the sequence ordered set handling remains the same. If configuration-ordered set handling is not implemented, then transitions to D and F are removed, and all xmit variables are forced to DATA.

The carrier sense state diagram in 1000BASE-X (indexed as FIG. 36-8 in the 1000BASE-X standard), the synchronization state diagram (indexed as FIG. 36-9 in the 1000BASE-X standard), and the low power idle transmit state diagram (indexed as FIG. 36-10 in the 1000BASE-X standard) does not need any change.

Returning to FIG. 11, at 906, the /K/D/ and /K/W/ loop is removed from the state diagram. The idle can be kept as /K/D/K/D/K/D/K/D/ . . . , while /Q/ is /K/W/K/W/K/W/K/W/, wherein |W| is a subset of |D| and is treated as idle at unmodified 1000BASE-X PCS. The added logic 902 and 903 differentiate whether [/x/] is in the set of |W| or not.

While various embodiments of the present disclosure have been shown and described herein, such embodiments are provided by way of example only. Numerous variations, changes, and substitutions relating to embodiments described herein are applicable without departing from the disclosure. It is noted that various alternatives to the embodiments of the disclosure described herein may be employed in practicing the disclosure. It is intended that the following claims define the scope of the disclosure and that methods and structures within the scope of these claims and their equivalents be covered thereby.

While operations are depicted in the drawings in a particular order, this is not to be construed as requiring that such operations be performed in the particular order shown or in sequential order, or that all illustrated operations be performed, to achieve the desirable results.

Suitable computer program code residing on a computer-readable medium may be provided for performing one or more functions in relation to at least the 2.5-Gigabit Ethernet data processing described in FIGS. 5 and 8, the sequence-ordered set mapping scheme described in FIGS. 6-7, and the sequence-ordered set passing state diagrams described in FIGS. 9-11. The term "computer-readable medium" as used herein refers to any non-transitory or transitory medium that provides or participates in providing instructions to a processor or other control/processing circuitry of the computing device (e.g., including a wireless receiver, transceiver, etc.) for execution. Such a medium may take many forms, including but not limited to non-volatile media and volatile media. Nonvolatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A method for providing a 2.5-gigabit high-speed Ethernet interface, the method comprising:
    receiving, at a physical layer of an Ethernet link, input data including a first sequence-ordered set in compliance with a 2.5-Gigabit physical coding sublayer intermediate interface (2.5GPII) protocol;
    aligning the input data into four parallel outputs of data in compliance with the 2.5GPII protocol;
    decoding the four parallel outputs of data in compliance with the 2.5GPII protocol to an output containing a second ordered set in compliance with 10-gigabit media-independent interface (XGMII) protocol; and
    transmitting the output to an XGMII or logical interface of the Ethernet link.

2. The method for providing a 2.5-gigabit high-speed Ethernet interface of claim 1, wherein the receiving, at the physical layer of an Ethernet link, input data including the first sequence-ordered set in compliance with the 2.5GPII protocol comprises:
    receiving, from a linking partner, the input data in a serial form having the first sequence-order set.

3. The method for providing a 2.5-gigabit high-speed Ethernet interface of claim 1, wherein the aligning the input data into four parallel outputs of data in compliance with the 2.5GPII protocol comprises:
    retrieving, from the input data, four consecutive bytes consisting of a first sequence code, a first byte of data, a second sequence code and a second byte of data;
    assigning the first sequence code to a first parallel output of the four parallel outputs;
    assigning the first byte of data to a second parallel output of the four parallel outputs;
    assigning the second byte of data to a third parallel output of the four parallel outputs; and
    assigning the third byte of data to a fourth parallel output of the four parallel outputs.

4. The method for providing a 2.5-gigabit high-speed Ethernet interface of claim 3, further comprising:
    using deficit idle counting (DIC) to enforce a start of packet at each parallel output of the four parallel outputs of data.

5. The method for providing a 2.5-gigabit high-speed Ethernet interface of claim 1, wherein the decoding the four parallel outputs of data in compliance with the 2.5GPII protocol to the output containing the second ordered set in compliance with 10-gigabit media-independent interface (XGMII) protocol comprises:
    mapping the four parallel outputs consisting of a first sequence code, a first byte of data, a second sequence code and a second byte of data in parallel to the second sequence-ordered set consisting of four consecutive bytes,
        wherein the four consecutive bytes include a third sequence set followed by three bytes of data.

6. The method for providing a 2.5-gigabit high-speed Ethernet interface of claim 5, further comprising:
    in response to determining that the first sequence-ordered set is a/Q/ordered set defined in IEEE 802.3z standard:
        configuring an eighth bit of a first data byte and an eighth bit of a second data byte as zero, and an eighth bit of a third data byte as one.

7. The method for providing a 2.5-gigabit high-speed Ethernet interface of claim 5, further comprising:
    in response to determining that the first sequence-ordered set is a /Fsig/ ordered set defined in IEEE 802.3z standard:
        configuring an eighth bit of a second data byte from the three bytes of data as one, wherein the second data byte follows a first data byte from the three bytes of data.

8. The method for providing a 2.5-gigabit high-speed Ethernet interface of claim 1, further comprising:
    abandoning every other first sequence-ordered set in the input data; and
    retrieving a variable from the input of data indicative of whether to abandon a next first sequence-ordered set in the input data.

9. The method for providing a 2.5-gigabit high-speed Ethernet interface of claim 1, wherein the transmitting the output to an XGMII or logical interface of the Ethernet link comprises:
    transmitting the output in compliance with the XGMII protocol to a medium access control (MAC) layer of the Ethernet link or a physical coding sublayer that is configured to convert XGMII input to 2.5GPII compatible input at a linking partner.

10. The method for providing a 2.5-gigabit high-speed Ethernet interface of claim 1, wherein the 2.5-gigabit high-speed Ethernet interface is applied at any of a reconciliation layer between the physical layer and a medium access control layer of the Ethernet link or the physical layer of the Ethernet link over copper or optical fiber.

11. A system for providing a 2.5-gigabit high-speed Ethernet interface, the system comprising:
    processing circuitry configured to:
        receive, at a physical layer of an Ethernet link, input data including a first sequence-ordered set in compliance with a 2.5-Gigabit physical coding sublayer intermediate interface (2.5GPII) protocol;

align the input data into four parallel outputs of data in compliance with the 2.5GPII protocol;
decode the four parallel outputs of data in compliance with the 2.5GPII protocol to an output containing a second ordered set in compliance with 10-gigabit media-independent interface (XGMII) protocol; and
transmit the output to an XGMII or logical interface of the Ethernet link.

12. The system for providing a 2.5-gigabit high-speed Ethernet interface of claim 11, wherein the processing circuitry, when receiving, at the physical layer of an Ethernet link, input data including the first sequence-ordered set in compliance with the 2.5GPII protocol, is further configured to:
receive, from a linking partner, the input data in a serial form having the first sequence-order set.

13. The system for providing a 2.5-gigabit high-speed Ethernet interface of claim 11, wherein the processing circuitry, when aligning the input data into four parallel outputs of data in compliance with the 2.5GPII protocol, is further configured to:
retrieve, from the input data, four consecutive bytes consisting of a first sequence code, a first byte of data, a second sequence code and a second byte of data;
assign the first sequence code to a first parallel output of the four parallel outputs;
assign the first byte of data to a second parallel output of the four parallel outputs;
assign the second byte of data to a third parallel output of the four parallel outputs; and
assign the third byte of data to a fourth parallel output of the four parallel outputs.

14. The system for providing a 2.5-gigabit high-speed Ethernet interface of claim 13, wherein the processing circuitry is further configured to:
use deficit idle counting (DIC) to enforce a start of packet at each parallel output of the four parallel outputs of data.

15. The system for providing a 2.5-gigabit high-speed Ethernet interface of claim 11, wherein the processing circuitry, when decoding the four parallel outputs of data in compliance with the 2.5GPII protocol to the output containing the second ordered set in compliance with 10-gigabit media-independent interface (XGMII) protocol, is further configured to:
map the four parallel outputs consisting of a first sequence code, a first byte of data, a second sequence code and a second byte of data in parallel to the second sequence-ordered set consisting of four consecutive bytes,
wherein the four consecutive bytes include a third sequence set followed by three bytes of data.

16. The system for providing a 2.5-gigabit high-speed Ethernet interface of claim 15, wherein the processing circuitry is further configured to:
in response to determining that the first sequence-ordered set is a /Q/ ordered set defined in IEEE 802.3z standard:
configure an eighth bit of a first data byte and an eighth bit of a second data byte as zero, and an eighth bit of a third data byte as one.

17. The system for providing a 2.5-gigabit high-speed Ethernet interface of claim 15, wherein the processing circuitry is further configured to:
in response to determining that the first sequence-ordered set is a /Fsig/ ordered set defined in IEEE 802.3z standard:
configure an eighth bit of a second data byte from the three bytes of data as one, wherein the second data byte follows a first data byte from the three bytes of data.

18. The system for providing a 2.5-gigabit high-speed Ethernet interface of claim 11, wherein the processing circuitry is further configured to:
abandon every other first sequence-ordered set in the input data; and
retrieve a variable from the input of data indicative of whether to abandon a next first sequence-ordered set in the input data.

19. The system for providing a 2.5-gigabit high-speed Ethernet interface of claim 11, wherein the processing circuitry, when transmitting the output to an XGMII or logical interface of the Ethernet link, is configured to:
transmit the output in compliance with the XGMII protocol to a medium access control (MAC) layer of the Ethernet link or a physical coding sublayer that is configured to convert XGMII input to 2.5GPII compatible input at a linking partner.

20. The system for providing a 2.5-gigabit high-speed Ethernet interface of claim 11, wherein the 2.5-gigabit high-speed Ethernet interface is applied at any of a reconciliation layer between the physical layer and a medium access control layer of the Ethernet link or the physical layer of the Ethernet link over copper or optical fiber.

* * * * *